UNITED STATES PATENT OFFICE.

FRITZ LOTTER, OF ALTENA, WESTPHALIA, PRUSSIA, GERMANY.

PROCESS OF REDUCING ORES OF NICKEL AND COBALT WITH OXIDE OF MANGANESE.

SPECIFICATION forming part of Letters Patent No. 339,067, dated March 30, 1886.

Application filed March 7, 1883. Serial No. 87,338. (No specimens.)

*To all whom it may concern:*

Be it known that I, FRITZ LOTTER, of Altena, Westphalia, Prussia, in the Empire of Germany, have invented certain new and useful Improvements in the Process of Reducing Nickel and Cobalt, of which the following is a specification.

Commercial nickel, even when tolerably free from impurities, cannot be well welded, hammered, and drawn, because the metal when in a molten condition absorbs oxygen and retains the protoxide thereby formed.

The object of my invention is to avoid this evil and produce the metal in such form that it may be readily worked.

To this end my invention consists in so managing the reduction of the ores of the metal that a certain percentage of metallic manganese may be formed and left with the reduced nickel, so as to absorb the oxygen when the alloy is worked, and prevent the formation of the objectionable protoxide of nickel.

The oxides of nickel and cobalt, free from injurious impurities, are reduced to powder by any ordinary or suitable means, and mixed intimately with powdered oxide of manganese, in proportions to be determined for each particular case, after which the compound is formed into cubes or cakes in the same manner as is usually practiced with the oxides of nickel and cobalt.

In carrying out my invention the oxides of nickel, free from any injurious impurities, are reduced to powder by any ordinary or suitable means, and mixed intimately with powdered oxide of manganese, in the proportion of one part of oxide of nickel with from two and a half to three per cent. of oxide of manganese. The compound is then formed into cubes or cakes, which are placed alternately with layers of charcoal-powder into refractory crucibles, the whole being finally well covered with charcoal-powder, and exposed about four hours to a temperature short of the point of fusion of metallic nickel, which ranges from about 2,500° to 3,000° Daniel's pyrometer. Care must be taken that the temperature does not reach above the degree named, so that the metal may not be fused. After the crucibles are cooled the metallic cubes are separated from the charcoal and scoured or cleaned. Said cube nickel contains yet about one and a half per cent. of metallic manganese mixed with it. In melting this cube nickel containing manganese, either alone or combined with other metals, the manganese will absorb the oxygen which otherwise would combine with the melting nickel or cobalt and be retained in the state of protoxide of nickel or cobalt, and thereby a nickel or cobalt free of oxide or a composition free of protoxide of nickel or cobalt be obtained. Therefore the melting process must be managed in such manner as to remove most of the manganese, but to let remain some small traces of it in the melting nickel, in order to prevent the latter from absorbing the oxygen. In such melting process a small portion of glass or borax will serve to take up and bind the oxides of manganese that form and separate themselves, and they may be removed in the form of slag. The remaining metal then is to be molded in convenient castings. The melted castings or cubes of nickel or cobalt thus produced always contain small traces of manganese—say one-quarter to three-quarter per cent. This small percentage of manganese which is left in the nickel cubes serves, till the melting process is finished, to prevent the absorption of oxygen, and is not at all detrimental to the final working of the metal. These melted nickel cubes are exceedingly pure, dense, and ductile, possessing a very bright luster, and may be rolled, welded, hammered, or otherwise worked. They may be alloyed with other metals—say with copper for coining purposes, or with copper and zinc for producing German silver—and will confer their qualities upon such compositions and improve their luster and ductility.

As above mentioned, the reduced cube nickel not yet melted—containing about one and one-half per cent. of metallic manganese—as obtained by the first operation of the process, is adapted to be used in metal composition, instead of nickel or cobalt, which is wholly free of oxides, for the reason that the manganese present at the melting will absorb oxygen, which would combine with the nickel. When it is absorbed by the manganese it can readily be separated from the composition in the form of slag. As these compositions rarely contain more than thirty per cent. of nickel, they consequently will contain barely one-fourth or one-half per cent. of manganese—an amount which will not at all interfere with the working of the composition metal.

I am aware that nickel containing manganese has been produced heretofore by smelting ores of nickel and manganese together, and also that nickel has been reduced without fusion by heating the ore or the mixture of reducing matters in closed crucibles, neither of which processes I desire to claim.

My process of reducing nickel and cobalt ores differs from the processes heretofore in use in this, that the oxides of nickel and cobalt, with a proper proportion of oxide of manganese, are formed into blocks, which are surrounded with pulverized charcoal in a crucible and subjected to a temperature of less than 3,000° Daniel's pyrometer.

What I claim as new is—

The process herein described of reducing nickel and cobalt from their ores, the same consisting in mixing with such ores in powder oxide of manganese in powder, in about the proportions named, forming the mass into blocks or cakes, and submitting the said blocks, surrounded by pulverized charcoal, to a temperature less than the point of fusion of metallic nickel or cobalt until reduction takes place, substantially as and for the purposes specified.

In testimony whereof I have hereunto set my hand and seal, at Cologne, this 9th day of February, 1883, in the presence of two subscribing witnesses.

FRITZ LOTTER. [L. S.]

Witnesses:
SAMUEL SPACKMAN,
TH. PEITMANN.